Figure 1:
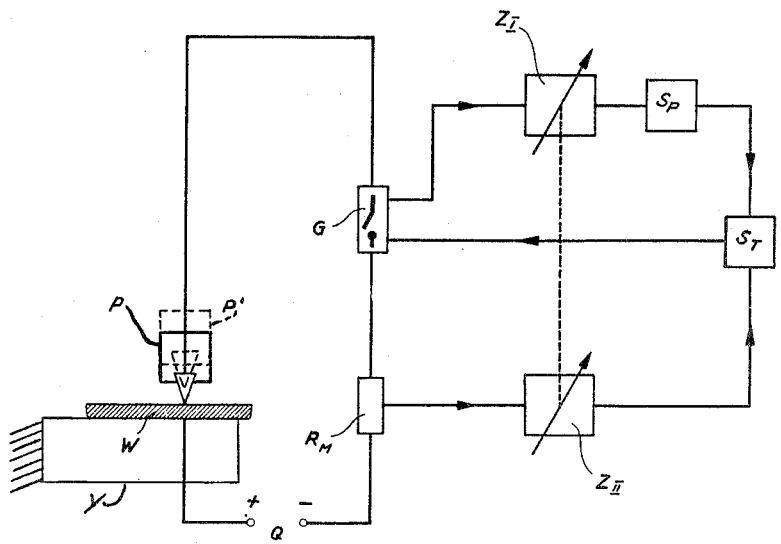

Dec. 22, 1964 H. NETZSCH 3,162,747
CONTROL AND REGULATING SYSTEM FOR ARC-WELDING
EQUIPMENT, MORE PARTICULARLY STUD
WELDING WITH POWER REGULATION
Filed Feb. 19, 1962 2 Sheets-Sheet 1

INVENTOR:
HERMANN NETZSCH

United States Patent Office 3,162,747
Patented Dec. 22, 1964

3,162,747
CONTROL AND REGULATING SYSTEM FOR ARC-WELDING EQUIPMENT, MORE PARTICULARLY STUD WELDING WITH POWER REGULATION
Hermann Netzsch, Grosshesselohe, near Munich, Germany, assignor to Crompton Parkinson Limited, London, England
Filed Feb. 19, 1962, Ser. No. 173,967
Claims priority, application Germany Feb. 21, 1961
12 Claims. (Cl. 219—98)

This invention relates to control and regulating means for arc-welding equipment and more particularly is concerned with bolt welding equipment providing for automatic regulation of the welding time according to the electrical power used at the weld point.

In bolt welding, a pin or bolt is welded to a workpiece by means of a high-intensity arc of short duration that passes between the spaced-apart bolt and workpiece. The arc between the tip of the bolt and the workpiece produces a small melt bath in the top of the workpiece into which the bolt is immersed after the welding current has been switched off. The correct combination of current intensity and welding time is important to the quality of the weld. A reduced current intensity may be compensated for, as an example, only by an appropriately longer welding time.

In bolt welders at present available, the operator is required to determine the correct combination of current intensity and current time duration by tests previously made or from empirical values, and he must adjust a control device to the appropriate welding time for a given current intensity. These values are then kept constant for a given welding job. Fluctuations in the current supply system, poor ground connections, variations in cable length, and so on, result in changes from the pre-set values which substantially deprive the operator of control. The fluctuations in arc current intensity automatically have an adverse effect on the weld. Moreover, the varying surface nature of the workpiece can influence the arc atmosphere and also vary the power employed at the weld. These uncontrollable fluctuations and irregularities are not compatible with the production of satisfactory bolt connections.

An arrangement for controlling resistance welding machines is known wherein the power at the weld point is controlled until the weld point has received the required amount of power for the welding operation. This is achieved in the following way: the instantaneous power flowing to the weld point is measured by an inertia-less system and is represented as a voltage which is applied to a time network consisting of a series-connected resistor and a condenser, the resistor and condenser having such characteristics that the voltage at the condenser is proportional to or corresponds to the temperature rise at the weld point. A circuit device is provided in which the voltage of the condenser is compared with a constant D.C. voltage corresponding to the desired value of the welding power. When the condenser voltage is equal to the constant D.C. voltage to which the system has been set, this circuit switches off the welding power. On the one hand, this known system is not intended for arc-welders, while on the other hand if one setting has produced a faulty weld it does not prevent a second faulty weld from being made.

In prior bolt welding apparatus of another type, the welding current power was detected by a cut-out fuse wire, the rating of which is related to the welding power considered necessary for a perfect bolt weld. If at the same time a certain minimum current has to be maintained, to allow for cooling of the fuse wire, it is in no relation to the minimum current intensity required for a satisfactory bolt weld. Although it is general knowledge that the welding current must exceed a certain value for a good weld, it has not yet been fully recognized that the current and time factors cannot be given any desired values for a constant product, namely the welding power. In addition, the conclusions to be drawn from this fact have not yet been appreciated.

The object of the present invention is to provide a control and regulating system for arc-welding equipment, more particularly bolt welders, to enable the operator to adjust the control system simply and with relation to the cross-section of the bolt to be welded, whereupon the welding time for the bolt in question is determined automatically and depending upon the current intensity actually prevailing at the weld point.

The values of the welding times permissible for a good weld cover a certain range; above or below this range the weld will be faulty. As soon as there is a departure from this range of welding times during welding operation—due to insufficient or excessive current intensity—the regulating system according to the invention is intended to give an indication and/or to block the equipment from use for any further welding, so as to avoid any further faulty welding.

To this end, the present invention provides for automatic regulation of the welding time according to the electrical power used at the weld point, characterised by measuring means for continuously measuring the current intensity in the welding circuit during welding and applying a voltage proportional to such measurement to a first time stage where it is integrated, the time constant of said time stage being adjustable according to the weld to be performed (e.g. the cross-section of the bolt), a voltage-dependent element which is subject to the action of the first time stage for breaking the welding circuit, and a second time stage which is dependent upon the welding current and which is adjustable to maximum values and minimum values for the time and the welding current intensity and which, when these limit values are exceeded or are not reached, produces a signal and/or prevents any further welding operation.

Figure 2:
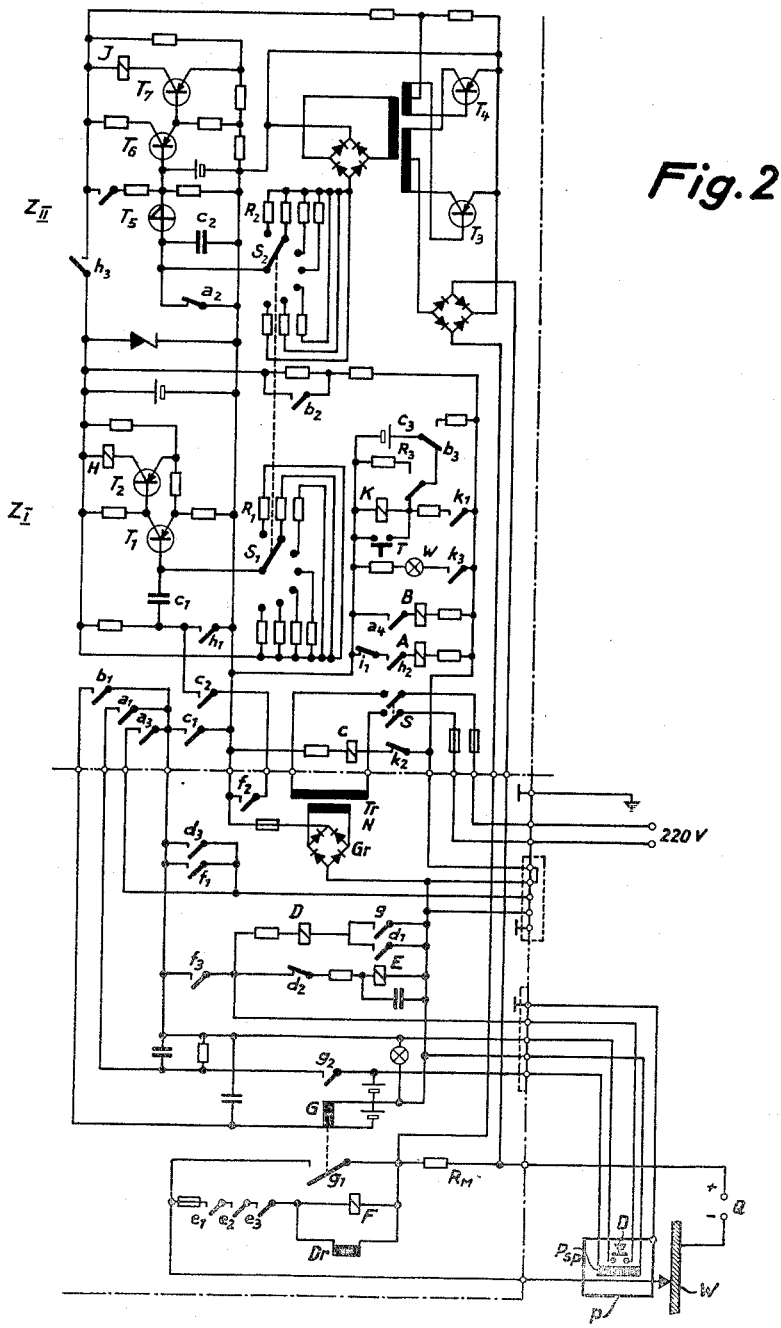

The invention will be described further, by way of example, with reference to one exemplified embodiment illustrated in the accompanying drawings wherein:

FIG. 1 is a simplified schematic block diagram illustrating control means according to the invention, as applied, for example, to a bolt welder; and FIG. 2 is a detailed circuit diagram of a bolt welder embodying a control according to the invention.

In FIG. 1, a D.C. source for feeding the welding circuit is denoted by reference letter Q. A conventional bolt welding gun P symbolically shown by a block and arrow is connected to one pole of this D.C. source, while a workpiece W is connected to the other pole thereof. Any suitable means is used, as at Y, for supporting or holding the workpiece. A contactor G serves to switch the welding circuit on and off.

The welding circuit contains a measuring network $R_M$, by means of which a measured voltage dependent upon the welding current actually flowing is detected and applied to a first electronic time stage $Z_{II}$, which is adjustable directly according to the cross-section of the bolt or the like to be welded. When the welding time determined by the time stage $Z_{II}$, in dependence upon the welding current actually flowing, has been reached, the contactor G is switched off by the time stage $Z_{II}$ by way of control elements $S_T$. The values adjustable at the time stage $Z_{II}$ are so adapted to the cross-section of the bolt to be welded that the power fed to the weld point, during the welding time determined by the time stage $Z_{II}$ in dependence upon the welding current, ensures a good weld. The time stage $Z_{II}$ in fact does not switch off until the weld point has received sufficient welding power.

In addition to the first time stage $Z_{II}$, there is a second electronic time stage $Z_I$, which is energized at substantially the same time as the first time stage $Z_{II}$ and the adjustment of which is coupled to that of the first time stage $Z_{II}$. The adjustable values of this time stage $Z_I$, however, are so chosen that they correspond to maximum values, i.e. welding time values which are adapted to the particular workpiece cross-sections and after the duration of which the weld is unsatisfactory. If these maximum values are exceeded, the time stage $Z_I$ automatically transmits a signal, by way of a blocking element $S_p$ and the control elements $S_T$ for blocking the performance of any subsequent welding operation, until the operator has unlocked the system, by switching off the welding current.

The welding operation will now be described in detail with reference to the circuit diagram of the practical embodiment of the control system according to the invention as shown in FIG. 2.

After a line switch S of the control system has been closed a power unit N, comprising a transformer $Tr$ and a Graetz or full-wave rectifier $Gr$, provides the required D.C. supply voltage. The relay C is energized and contacts $c_1$ and $c_2$ of such relay C close. Upon operation of a trigger D on weld gun P, a relay E is energized and contacts $e_1$, $e_2$ and $e_3$ of the relay E close. A limited current therefore flows in the welding circuit through choke $Dr$, and if the current is sufficiently high it causes a relay F parallel with the choke $Dr$ to be energized. Contact $f_3$ of the relay F holds the relay E energized until a main contactor G is energized and its switch contact $g_1$ closes, in the event of premature release of the trigger D of the welding gun P. Contact $f_2$ of the relay F energizes the time stage $Z_I$.

Time stage $Z_I$ includes a switch $S_1$ whose arm can be rotated to contact any one of a plurality of terminals connected respectively to resistors $R_1$. The choice of resistor cooperating with condenser $C_1$ provides the desired time constant of the circuit, which includes transistors $T_1$ and $T_2$. The transistor $T_1$ blocks whilst the transistor $T_2$ conducts, and so relay H is energized. Contact $h_1$ of the relay H closes and acts as an interlock contact; contact $h_2$ of the relay H causes a relay A to be energized and contact $a_4$ of the relay A causes a relay B to be energized; contact $h_3$ of the relay H simultaneously applies the supply voltage to a second time stage $Z_{II}$. The second time stage $Z_{II}$ comprises a switch $S_2$, having contacts connected with a plurality of resistors $R_2$, a condenser $C_2$, a Shockley diode $T_5$, and transistors $T_6$ and $T_7$. The switch arm of $S_2$ is ganged with that of $S_1$. When the supply voltage is applied to energize time stage $Z_{II}$, contact $a_1$ of the relay A switches on gun coil $P_{sp}$; contact $b_1$ of relay B energizes the coil of the main contactor G; the gun P lifts from the workpiece W to its normal welding position spaced above said workpiece as shown by the broken line block and arrow P' in FIG. 1 and contact $g_1$ of the contactor G switches on the welding current to draw an arc across the intervening space.

The welding current now flowing results in a voltage drop across the measuring resistance $R_M$ contained in the welding circuit. The said resistance will be quite low, having a value of 0.003 ohm for example. For a welding current of 1000 amperes, the voltage drop will be 3 volts, for a welding current of 500 amperes, 1.5 volts, and so on. This voltage drop which occurs across the measuring resistance $R_M$ and which is linearly proportional to the welding current flowing, is amplified by transistors $T_3$, $T_4$ and the associated transformer and after rectification is applied to the time stage $Z_{II}$. The Shockley diode $T_5$ is connected as a voltage-sensitive element to this time circuit, and operates like a gas-discharge tube, i.e. it will be non-conductive below a certain value of the applied voltage and then passes from the non-conductive to the conductive state with a very small internal resistance, becoming non-conductive once more as soon as the current flowing through it drops below a certain minimum value. Such diode $T_5$ may be termed a "controlled rectifier." If the voltage at the condenser $C_2$ has reached a certain level, for example 20 volts in the present case, the diode $T_5$ conducts and the resultant current pulse is amplified in $T_6$ and $T_7$ so that relay I is energized. Contact $i_1$ of the relay I switches off the relays A and B and hence also the gun coil $P_{sp}$ and, with a small delay, the contactor G.

The welding process has now been concluded, and the relay I continues to remain energized through an interlock contact $i_2$ of the relay I until the relay H is de-energized (as a result of the condenser $C_1$ which also charges) and switches off the current supply to the time stage $Z_{II}$ by its contact $h_3$. If the trigger D of the gun P is kept closed during the entire process, then after the main welding current has been switched on relay D is energized, this being initiated by an auxiliary contact $g$ on the contactor G, and switches off the relay E. The relay D remains energized until the gun trigger D is released; only then can a new welding process be initiated.

With regard to the actual time stage $Z_{II}$ the condenser $C_2$ will naturally be charged at a faster rate for smaller values of the series resistance $R_2$ at the switch $S_2$ and the higher the charging voltage for charging the condenser $C_2$. The charging voltage is obtained from the D.C. amplifier and is approximately proportional to the voltage drop at the measuring resistance $R_M$ in the welding circuit. Twice the welding current therefore means twice the voltage for the RC network and hence results in the system being switched off in half the time. The resistors $R_2$ contained in the switch $S_2$ are of such resistance that the welding times required according to the individual workpiece dimensions (for example the bolt diameter) are achieved for a given current. If the current departs from this desired value, the associated time is automatically corrected with the ultimate object of keeping the product of the current and time constant.

The current, of course, cannot be compensated by the time to any desired extent. As the welding current reduces there will be a point at which the heat dissipation makes any further increase in time useless. This lower current limit will vary according to the bolt size and must be indicated to the operator.

According to the present exemplified embodiment, if the welding current is too low, the welding device prevents any further weld from being executed after the first bolt has been welded. This is achieved in the following way: certain maximum time values are also associated with each bolt dimensions by way of the resistors $R_1$ connected to the switch $S_1$ in the time stage $Z_I$ consisting of $T_1$, $T_2$, $C_1$ and $R_1$. If the welding current is too low for the time stage $Z_{II}$ fed by the D.C. amplifier to switch off the system within this maximum time, the system is switched off by the time stage $Z_I$ consisting of $T_1$, $T_2$ and $C_1$. Charging of the condenser $C_1$ causes the transistor $T_1$ to conduct again, and the transistor $T_2$ cuts off; the relay H is de-energized and switches off the relays A and B and hence the contactor G and the gun coil $P_{sp}$ by way of the contact $h_2$. Since the relay H is now de-energized before the relay B, the condenser $C_3$ is no longer discharged through a protective resistance $R_3$ but by way of the relay K which is energized and holds itself so energized by way of contact $k_1$, switches on a warning lamp L by means of contact $k_3$ and switches off the relay C by way of contact $k_2$. It is thus impossible for another welding operation to be initiated, since de-energizing of the relay C breaks the current supply to the entire control system. The initial state is restored only by operation of key T and the device is then ready for the next welding operation using a higher current.

I claim:

1. Apparatus for welding together, a first, metallic bolt member and a second, metallic work piece member which comprises, means for holding said first and second members in spaced apart relation during a first welding stage, means for applying an electrical voltage between said two spaced apart members, means for measuring current flow through said applying means, means for deriving a voltage proportional to said current flow, a first time stage connected in circuit with said deriving means for integrating said proportional voltage, means for adjusting the time constant of said time stage in relation to the weld to be accomplished, a voltage responsive element responsive to signals generated in said time stage for interrupting current flow through said applying means, and a second time stage being responsive to a predetermined value of current which will produce an unsatisfactory weld for a given time constant of said first time stage for producing a control signal, and indicating means driven by said control signal.

2. Apparatus as set forth in claim 1, in which said indicating means includes means for applying said control signal to disable said apparatus.

3. In an arc welding circuit for welding a first electrode to a work piece and having a second electrode connected in circuit with said first electrode, a source of welding current and first means for holding said second electrode in contact with said work piece and said first electrode in spaced apart relation therefrom during a first interval, a first timing circuit for enabling the flow of welding current between said electrodes, said timing circuit comprising first means adjustable in accordance with the dimensions of said first electrode to be welded to said work piece and a second timing circuit connected in operative relation with said first timing circuit, said second timer circuit comprising means adjustable for imposing a first threshold limitation on the duraiton of the enabling of said welding current flow, and for imposing a second threshold limitation on the level of current flowing in said welding circuit, whereby welding current flow is terminated when said welding current flows beyond a preassigned time interval and when said welding current falls below a preassigned threshold level.

4. Apparatus for welding together a first, metallic bolt member and a second, metallic work piece member which comprises means for holding said first and second members in spaced apart relation during a first welding stage, means for applying an electrical voltage in circuit between said two spaced apart members for urging current flow therebetween, means for sensing resultant current flowing through said so connected applying means and for deriving a voltage proportional to said last named current, a time stage connected in circuit with said last named deriving means for integrating said last named voltage with respect to the passage of time to derive a control voltage, means for adjusting the integration time constant of said time stage in relation to the welding to be accomplished, and a voltage responsive control element responsive to said control voltage for regulating current flow through said applying means in relation to said integrated voltage.

5. Apparatus as set forth in claim 4 and, in combination therewith, a next time stage responsive to currents of amplitudes outside first and second preassigned thresholds for disabling said apparatus.

6. In an arc welding equipment which includes means for connection with a source of welding power, a welding circuit for applying said welding power, first and second electrodes connected in said welding circuit, means for holding at least one of said electrodes in spaced apart relation to a workpiece to be welded whereby current will flow in said welding circuit by an arc between said spaced apart electrode and said workpiece, and circuit interrupter means adapted to be closed to complete the welding circuit to said source of welding power, means for controlling and automatically regulating the welding time according to the electrical power used at the weld point, comprising means measuring the current intensity in the welding circuit and producing a voltage proportional to said current intensity, a first time stage having integrating means therein, means for applying the said voltage to said first time stage to be integrated therein and produce a first signal output as a result thereof, said time stage having an RC time circuit with means for adjusting the time constant according to the size of weld to be performed, said first time stage being connected with said circuit interrupter means to apply said first signal output thereto to open the welding circuit at the end of the welding time as determined by said time constant so that the welding will stop, and a second time stage which is dependent on the welding current and having said voltage applied thereto simultaneously with application to said first time stage, said second time stage having a second RC time circuit with means for adjusting the time constant according to the maximum and minimum values respectively of the welding time and welding current intensity for a satisfactory weld of said size of weld, said second time stage having means for producing a second signal output in the event the welding current for the weld at the time determined by the time constant of said first time stage is too low to produce a satisfactory weld, and indicating means operated by said second signal output.

7. A structure as claimed in claim 6 in which said indicating means include a circuit connected with said interrupter means to prevent completing of the welding circuit whereby further operation of said equipment after one weld is blocked.

8. A structure as claimed in claim 6 in which means are provided to gang the RC circuits together so that adjustment of both is executed simultaneously.

9. A structure as claimed in claim 7 in which said second time stage comprises a condenser, means for charging the condenser commencing at the beginning of a welding operation, a blocking relay, means for discharging the condenser through said blocking relay by said second signal output, said relay connected to said interrupter means and having a holding circuit whereby to keep the interrupter means open until the holding circuit is opened.

10. In an arc welding equipment which includes means for connection with a source of welding power, a welding circuit for applying said welding power, first and second electrodes connected in said welding circuit, means for holding at least one of said electrodes in spaced apart relation to a workpiece to be welded whereby current will flow in said welding circuit by an arc between said spaced apart electrode and said workpiece, and circuit interrupter means adapted to be closed to complete the welding circuit to said source of welding power, means for controlling and automatically regulating the welding time according to the electrical power used at the weld point, comprising means measuring the current intensity in the welding circuit and producing a voltage proportional to said current intensity, a first time stage having integrating means therein, means for applying the said voltage to said first time stage to be integrated therein and produce a first signal output as a result thereof, said time stage having an RC time circuit with means for adjusting the time constant according to the size of weld to be performed, said first time stage being connected with said circuit interrupter means to apply said first signal output thereto to open the welding circuit at the end of the welding time as determined by said time constant so that the welding will stop.

11. A structure as claimed in claim 10 in which said time circuit includes a controlled rectifier, the RC time circuit having a condenser and charging circuit conneted to initiate conduction of current in said rectifier when a predetermined charge is accumulated by said condenser, switch means connected to said diode for operating said interrupter when said rectifier conducts.

12. A structure as claimed in claim 11 in which time delay means are provided to open the rectifier circuit after the welding has stopped.

References Cited in the file of this patent

UNITED STATES PATENTS

| | | |
|---|---|---|
| 1,959,690 | Roth | May 22, 1934 |
| 2,472,041 | Davies | May 31, 1942 |
| 2,306,593 | Collom | Dec. 29, 1942 |
| 2,472,043 | Callender | May 31, 1949 |